(12) United States Patent
Miyata et al.

(10) Patent No.: US 9,776,922 B2
(45) Date of Patent: Oct. 3, 2017

(54) SHUTTLE KILN FOR FIRING CERAMIC POROUS BODIES

(71) Applicant: NGK Insulators, Ltd., Nagoya-shi, Aichi-Prefecture (JP)

(72) Inventors: Jotaro Miyata, Komaki (JP); Chikashi Ihara, Nagoya (JP); Takashi Yasue, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 487 days.

(21) Appl. No.: 14/022,619

(22) Filed: Sep. 10, 2013

(65) Prior Publication Data
US 2014/0011151 A1    Jan. 9, 2014

Related U.S. Application Data

(63) Continuation of application No. PCT/JP2012/056672, filed on Mar. 15, 2012.

(30) Foreign Application Priority Data
Mar. 17, 2011  (JP) ................................ 2011-058924

(51) Int. Cl.
*C04B 33/32*  (2006.01)
*C04B 35/638*  (2006.01)
(Continued)

(52) U.S. Cl.
CPC ............ *C04B 33/32* (2013.01); *C04B 35/638* (2013.01); *C04B 35/64* (2013.01);
(Continued)

(58) Field of Classification Search
CPC ............ C04B 2235/6586; C04B 38/06; C04B 2235/6584; C04B 2235/6565;
(Continued)

(56) References Cited

U.S. PATENT DOCUMENTS 1,629,253 A * 5/1927 Breese, Jr. .............. F23D 11/36
                                                      431/115
2,795,054 A * 6/1957 Bowen, III ........... F26B 23/024
                                                      118/61
(Continued)

FOREIGN PATENT DOCUMENTS

CN    1278782 A    1/2001
CN    1278783 A    1/2001
(Continued)

OTHER PUBLICATIONS

Chinese Office Action, Chinese Application No. 201280009807.0, dated Sep. 26, 2014 (7 pages).
(Continued)

*Primary Examiner* — Steven B McAllister
*Assistant Examiner* — Steven Anderson, II
(74) *Attorney, Agent, or Firm* — Burr & Brown, PLLC

(57) ABSTRACT

The invention provides a shuttle kiln that can fire ceramic porous bodies containing organic binders in a shorter period of time than in conventional methods without occurring breaks due to a temperature difference between the inside and the outside. The shuttle kiln of the invention is suited for firing of ceramic porous bodies containing organic binders. It includes a gas suction path 4 that suctions in-furnace gas and discharges it via an afterburner 5 and a circulation path 7 that suctions the in-furnace gas to the furnace outside to burn organic binder gas and then returns it into the furnace.

5 Claims, 4 Drawing Sheets

(51) Int. Cl.
- *C04B 35/64* (2006.01)
- *F27B 17/00* (2006.01)
- *F27D 7/06* (2006.01)
- *C04B 38/00* (2006.01)
- *C04B 38/06* (2006.01)

(52) U.S. Cl.
CPC .......... *C04B 38/0006* (2013.01); *C04B 38/06* (2013.01); *F27B 17/0041* (2013.01); *F27D 7/06* (2013.01); *C04B 2235/6562* (2013.01); *C04B 2235/6565* (2013.01); *C04B 2235/6584* (2013.01); *C04B 2235/6586* (2013.01)

(58) Field of Classification Search
CPC .......... C04B 2235/6562; C04B 35/638; C04B 35/64; F27B 17/0041; F27B 17/0075; F27B 17/0083; F27D 7/06
USPC ........................................ 432/152, 149, 150
See application file for complete search history.

(56) References Cited

U.S. PATENT DOCUMENTS

| | | | | |
|---|---|---|---|---|
| 3,861,334 A * | 1/1975 | Stockman | ................. | F23G 5/46 110/187 |
| 4,061,463 A * | 12/1977 | Bennett | ................. | F26B 23/02 431/1 |
| 4,217,090 A * | 8/1980 | Whike | ................. | F27B 9/36 432/21 |
| 4,715,810 A * | 12/1987 | Ramsey | ................. | C22B 1/005 110/222 |
| 4,829,703 A * | 5/1989 | Watson | ................. | C22B 21/0084 110/162 |
| 4,995,807 A * | 2/1991 | Rampley | ................. | F23C 9/00 431/115 |
| 5,554,350 A * | 9/1996 | Gurvich | ................. | C01B 17/74 423/239.1 |
| 5,795,146 A * | 8/1998 | Orbeck | ................. | F27B 17/0083 432/176 |
| 6,099,793 A * | 8/2000 | Dull | ................. | C04B 35/195 264/630 |
| 6,287,509 B1 | 9/2001 | Gheorghiu | | |
| 8,985,472 B2 * | 3/2015 | Peterman | ................. | 236/10 |
| 2002/0003322 A1* | 1/2002 | Dull | ................. | C04B 35/195 264/630 |
| 2007/0054229 A1* | 3/2007 | Hanzawa | ................. | C04B 35/638 432/266 |
| 2011/0034318 A1* | 2/2011 | Gasafi | ................. | B01J 6/002 501/150 |

FOREIGN PATENT DOCUMENTS

| | | | | |
|---|---|---|---|---|
| CN | 1882518 A | 12/2006 | | |
| DE | 3716444 | * 12/1988 | | |
| GB | 830136 A | * 3/1960 | .......... | F27B 17/0041 |
| JP | 01-203273 | 8/1989 | | |
| JP | 2001-524451 | 12/2001 | | |
| JP | 2002-284582 | 10/2002 | | |
| JP | 2007-001843 | 1/2007 | | |
| WO | 2005/047207 | 5/2005 | | |

OTHER PUBLICATIONS

International Search Report, International Application No. PCT/JP2012/056672, dated Jun. 19, 2012 (2 pages).

* cited by examiner

SHUTTLE KILN FOR FIRING CERAMIC POROUS BODIES

BACKGROUND OF THE INVENTION

1. Field of the Invention

The invention relates to a shuttle kiln for firing ceramic porous bodies containing organic binders, and more specifically to a shuttle kiln suitable for firing ceramic honeycomb structures.

2. Description of Related Art

As a furnace for firing ceramic porous bodies to be mass-produced, a continuous-type furnace represented by a tunnel kiln or a roller hearth kiln and a batch-type furnace represented by a shuttle kiln are widely used. The shuttle kiln is a batch-type firing furnace for firing porous materials loaded on a carriage stored in the furnace and is named so because the carriage reciprocates between the inside and the outside of the furnace.

In firing of ceramic porous bodies containing organic binders in the shuttle kiln, in an early phase of temperature rising, a large amount of organic binder vapor generates from the unfired ceramic porous bodies. To secure safety in this phase, it is necessary to control the concentration of the organic binder vapor in the furnace to a level below the explosion limit. Typical examples of organic binder are methylcellulose, polyvinyl alcohol, etc.

Typically, a burner is ignited at high excess air ratio m of 30 to 50, and its burner flame speed is increased to stir the inside of the furnace efficiently and also introduce a large amount of air into the furnace in order to control the concentration of the organic binder vapor to a level below the explosion limit. Therefore, naturally, an oxygen concentration in the furnace rises to burn the organic binder vapor at the surface of the ceramic porous bodies. However, since ceramic porous bodies such as a ceramic honeycomb structure have excellent thermal insulation properties, the following problems occur.

That is, in the early phase, as the organic binder vapor burns, a periphery of the ceramic porous body is heated to promote releasing of binder. However, the heat of the ceramic porous body is hardly transferred to the inside because of its excellent thermal insulation properties. Then, as the internal temperature rises gradually, the organic binder in the furnace burns progressively so that the internal temperature of the ceramic porous body may start rising. However, the heat does not easily transfer to the periphery of the ceramic porous body, and its inside temperature becomes higher than periphery. Consequently, tensile force acts inside the ceramic porous body in the early phase of a binder releasing process and, by contrast, acts outside in the later phase of the process. As a result, the ceramic porous body is liable to have cracks referred to as "breaks" and therefore be defective.

To avoid such problem, the rate of temperature rise in the furnace can be decreased to slow down the binder releasing process. At the same time, however, the firing cycle is prolonged, inevitably resulting in decrease in productivity.

To solve the problem, Patent Document 1 according to the application by the present applicant discloses a technology of decreasing the concentration of oxygen in the furnace in the binder releasing process to thereby suppress burning of organic binders so that the cracks occurrence may be prevented. As specific means for the purpose, a method of reducing the air ratio of a burner and a method of introducing a nitrogen gas is described.

In the case of a ceramic honeycomb structure, to suppress a temperature difference that causes the cracks, the oxygen concentration should be kept at 8% or less, or preferably 5% or less. However, this is accompanied by cost-related problems because, for example, a large amount of nitrogen gas is required. Further, if the burner's air ratio is decreased to lower the in-furnace oxygen concentration, stirring in the furnace cannot become well due to an insufficient amount of the internal gas and its internal temperature distribution is liable to be inhomogeneous.

Patent Document 2 describes another method to lower the in-furnace oxygen concentration by use of a large amount of low-oxygen gas, specifically by suctioning an in-furnace gas containing organic binders gas, completely burning it with an afterburner, and drawing back the generated combustion gas into the furnace.

However, in the case of a batch-type furnace represented by a shuttle kiln, a suction port for the in-furnace gas is exposed to a high temperature of 1000° C. or higher during a firing process following the binder releasing process and cannot be sealed completely; therefore, not a small amount of fresh air is mixed when the in-furnace gas is suctioned. Moreover, in the case of a shuttle kiln, as a carriage needs to reciprocate between the inside and the outside of the furnace, if the in-furnace suction port is formed at the lower part of the furnace body, namely in the carriage, it is very difficult to seal a portion between the port and a smoke path inlet port located at a lower part of the carriage. Therefore, fresh air is mixed inevitably when the in-furnace gas is suctioned. As a result, the oxygen concentration of combustion gas generated via the afterburner decreases only to about 10%, causing a problem that even if the combustion gas is drawn back into the furnace, the oxygen concentration in the furnace cannot be kept at a sufficiently low level.

PRIOR ART TECHNOLOGICAL LITERATURE

Patent Documents

Patent Document 1: JP H1-203273 A
Patent Document 2: JP 2001-524451 W

SUMMARY OF THE INVENTION

Problem to be Solved by the Invention

In view of the above, it is an object of the invention to solve the conventional problems and provide a shuttle kiln that can fire ceramic porous bodies containing organic binders in a shorter period of time than in conventional methods without generating a break due to a temperature difference between the inside and the outside.

Means for Solving Problems

To solve the problems, the invention provides a shuttle kiln for firing ceramic porous bodies containing organic binders. The kiln includes a gas suction path for suctioning an in-furnace gas and exhausting it via the afterburner, and a circulation path for suctioning the in-furnace gas to the furnace outside, burning organic binder gases, and drawing back the in-furnace gas into the furnace.

It is preferable to suction the in-furnace gas to the gas suction path from a top or bottom portion of the furnace body and suction the in-furnace gas to the circulation path from a side wall of the furnace body. Preferably the circulation path includes a catalytic reactor vessel for catalytic combustion of the suctioned-furnace gas, a fuel gas supply pipe mounted at a stage preceding the catalytic reactor vessel and used to supply a fuel gas, a heating device mounted at the stage preceding the catalytic reactor vessel and used to heat the suctioned in-furnace gas, and a cooling device mounted at a stage following the catalytic reactor vessel and used to lower a temperature of the gas having passed through the catalytic reactor vessel to a predetermined temperature. Further, the ceramic porous bodies containing the organic binder can be of honeycomb structures. Further, preferably the circulation path is operated during binder releasing process and has a function of keeping an in-furnace oxygen concentration at 8% or less, or preferably 5% or less.

Effects of the Invention

A shuttle kiln of the invention includes a gas suction path for suctioning in an in-furnace gas and exhausting it via an afterburner and another path, namely, a circulation path for suctioning the in-furnace gas to the furnace outside, burning organic binder gases, and drawing back the in-furnace gas into the furnace. With this configuration, the in-furnace gas can be circulated without allowing mixing of fresh air, and an oxygen concentration can be reduced to a desired level because oxygen in the in-furnace gas are consumed through combustion. At the same time, as the organic binders are also burned, its concentration can be lowered to easily control the concentration of the in-furnace organic binder gases to a level below the explosion limit. Moreover, by increasing the speed of circulation, stirring in the furnace can be promoted to prevent the in-furnace temperature distribution from becoming inhomogeneous.

Further, the shuttle kiln of the invention includes the gas suction path for suctioning the in-furnace gas and exhausting it via the afterburner and, therefore, can suction fresh air, which has inevitably entered the furnace, along with the in-furnace gas, burn the contained organic binder gases, and then exhaust it.

Therefore, according to the shuttle kiln of the invention, as binder releasing process can be performed while inhibiting the organic binder gases from burning on the surface of a ceramic porous bodies and a temperature difference between the inside and the outside of the ceramic porous bodies can be reduced, no breaks occur. Further, as the binder releasing process can be progressed by increasing a rate of temperature rise, a firing time can be shortened. Moreover, as nitrogen gas etc. need not be used, increase in running costs can be prevented.

Further, by providing a heating device, a catalytic reactor vessel, and a cooling device for the in-furnace gas suctioned the circulation path, the in-furnace gas can be heated to promote catalytic combustion. In addition, as the gases having passed through the catalytic reactor vessel is cooled by the cooling device to a predetermined temperature and then returned into the furnace, the in-furnace temperature does not fluctuate.

Furthermore, it is not easy to control combustion of many burners placed in the furnace body because the in-furnace temperature needs to be raised moderately in the binder releasing process; however, according to the shuttle kiln of the invention, as the many burners placed in the furnace body can be stopped in combustion to control temperature by using only the heating device mounted along the circulation path, the in-furnace temperature can be raised moderately.

DETAILED DESCRIPTION OF THE INVENTION

Preferred embodiments of the invention will be described below. In the present embodiment, what is to be fired are ceramic honeycomb structures, namely ceramic porous bodies containing organic binders. The unfired ceramic porous bodies are loaded on a carriage and carried into a furnace to evaporate the organic binder at about 200° C. and then fired at an elevated temperature of about 1500° C.

Figure 1:
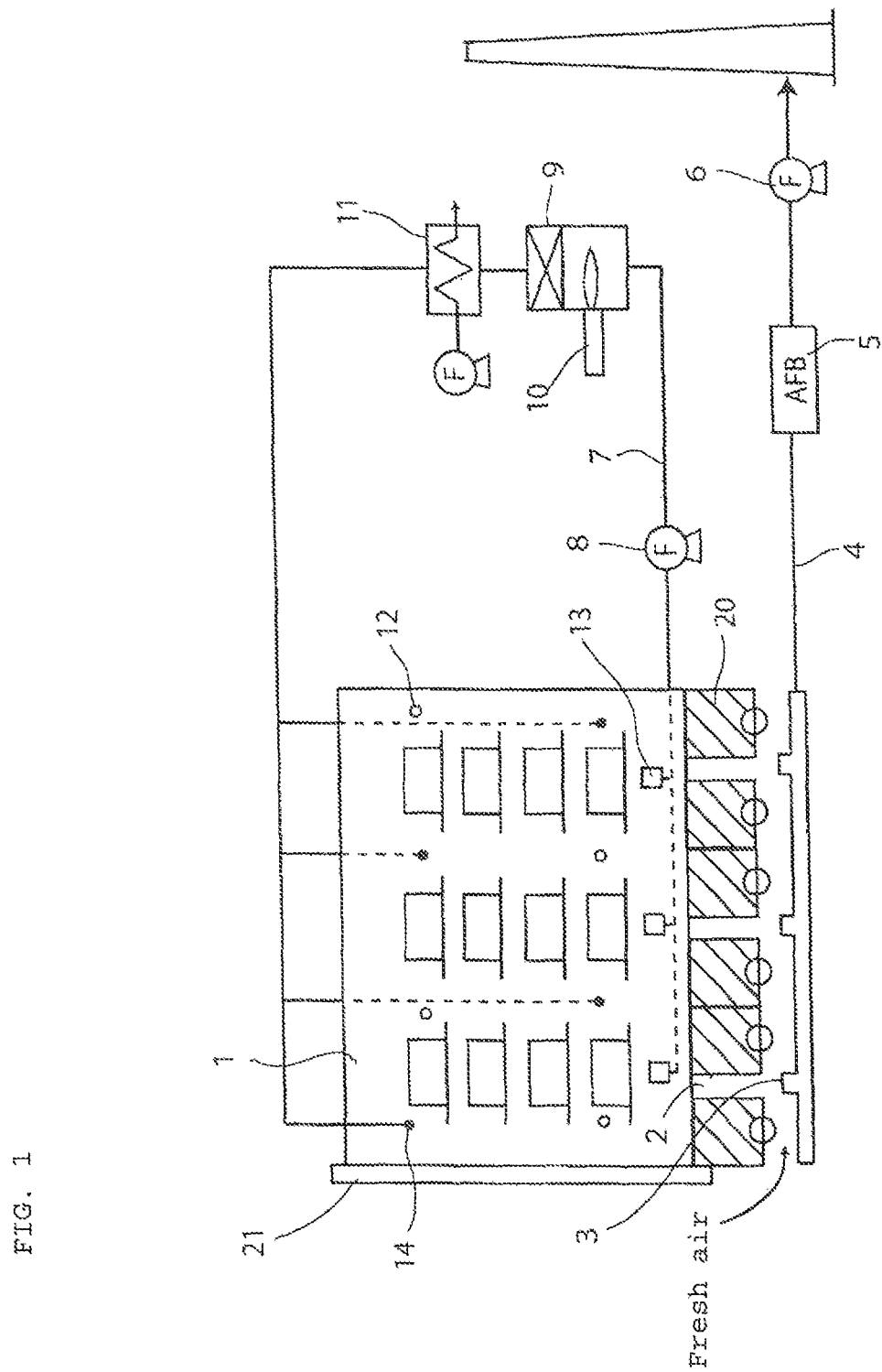
FIG. 1 is a schematic diagram showing an embodiment of the invention.

In FIG. 1, numeral 1 indicates a furnace body of a shuttle kiln. Although three carriages 20 placed in the furnace are shown in FIG. 1 for simplification, actually the furnace body 1 extends horizontally and an entry door 21 is opened to allow many carriages to enter the furnace body 1 for firing. On the bottom surface of each of the carriages 20, a gas flow path 2 is formed. At the lower part of each carriage, a gas suction path 4 including a gas suction port 3 is placed at a position facing the gas flow paths 2. As described above, since the shuttle kiln needs to have a traveling mechanism for the carriages 20, the lower part of the furnace body cannot be sealed completely. However, by providing the gas suction path 4, some fresh air having entered from the outside as denoted by an arrow can be prevented from entering the furnace body because it is suctioned to the gas suction path 4 together with the in-furnace gas. In this case, the gas is not limited to be suctioned through the lower part of the carriage because it can be drawn in through the top or rear wall of the furnace body 1 depending on a furnace structure.

The gas suction path 4 includes an afterburner 5 and a suction fan 6. During the binder releasing process in an early phase of temperature rising, the organic binder contained in the ceramic porous bodies evaporates and therefore vapor of the organic binder is contained also in in-furnace gas suctioned to the gas suction path 4. The organic binder vapor is completely burned by the afterburner 5 and released into the atmosphere.

The shuttle kiln of the invention includes a circulation path 7 in addition to the gas suction path 4. The circulation path 7 is used to suction the in-furnace gas from the furnace through a circulating suction port 13 formed in a side wall of the furnace body 1 and burn the organic binder gases and then draw it back into the furnace through a circulating return port 14. By providing the circulation path 7 in addition to the gas suction path 4, it is possible to reduce the burden on and down size of the afterburner as compared to a method that includes only the gas suction path 4 to suction the whole amount of in-furnace gas containing organic binder gases to the gas suction path 4, completely burn it with the afterburner, and draw back the resultant combustion gas into the furnace.

The circulating suction port 13 and the circulating return port 14 should preferably be disposed to positions where they may not disturb a flow of the in-furnace gas. In the present embodiment, the in-furnace gas may be suctioned by a circulation fan 8 through the circulating suction port 13 formed at a plurality of positions on the lower part of the side wall of the furnace body 1 and drawn back into the furnace via the circulating return port 14 formed at those multiple positions. Generally, from the viewpoint of in-furnace temperature distribution and thermal efficiency, a downward flow should preferably be formed in the furnace. For this purpose, in the present embodiment, the gas is suctioned from the lower part of the side wall and drawn back from the upper part of the side wall. However, those ports need not always be disposed to those positions. In some cases, the gas can be drawn from the upper part of the side wall or the top portion and drawn back from the lower part of the side wall.

The circulation path 7 includes a combustion device 9 for burning the organic binder gases contained in the suctioned in-furnace gas. The combustion device 9, which should preferably be a catalytic reactor vessel, serves to burn the organic binder gases contained in the in-furnace gas and consume oxygen in the in-furnace gas through the burning so that the oxygen concentration may lower. The catalytic reactor vessel is made up of, for example, a ceramic honeycomb structure containing a precious-metal oxidation catalyst such as platinum or palladium and, therefore, can progress catalytic combustion even in condition where the organic binder gas concentration is low or in the condition that the oxygen concentration is low. However, the catalytic reactor vessel is not limited to this type.

Since catalyst activity of the catalytic reactor vessel is influenced by the temperature, a heating device 10 is mounted to the stage preceding the catalytic reactor vessel to increase the temperature of the suctioned in-furnace gas to, for example, about 300° C. Further, since the in-furnace gas temperature is increased by catalytic combustion, if the gas is returned directly into the furnace body 1, the in-furnace temperature is disturbed. Therefore, it is preferable to provide, at a stage following the catalytic reactor vessel, a cooling device 11 for lowering the temperature of the gas having passed through the catalytic reactor vessel to about a predetermined in-furnace temperature. The heating device 10 is a gas burner or an electric heater and the cooling device 11 is a heat exchanger. The circulation path 7 is used in the binder releasing process in the early temperature rising phase and stopped in a firing process in which firing is performed at a higher temperature.

Figure 3:
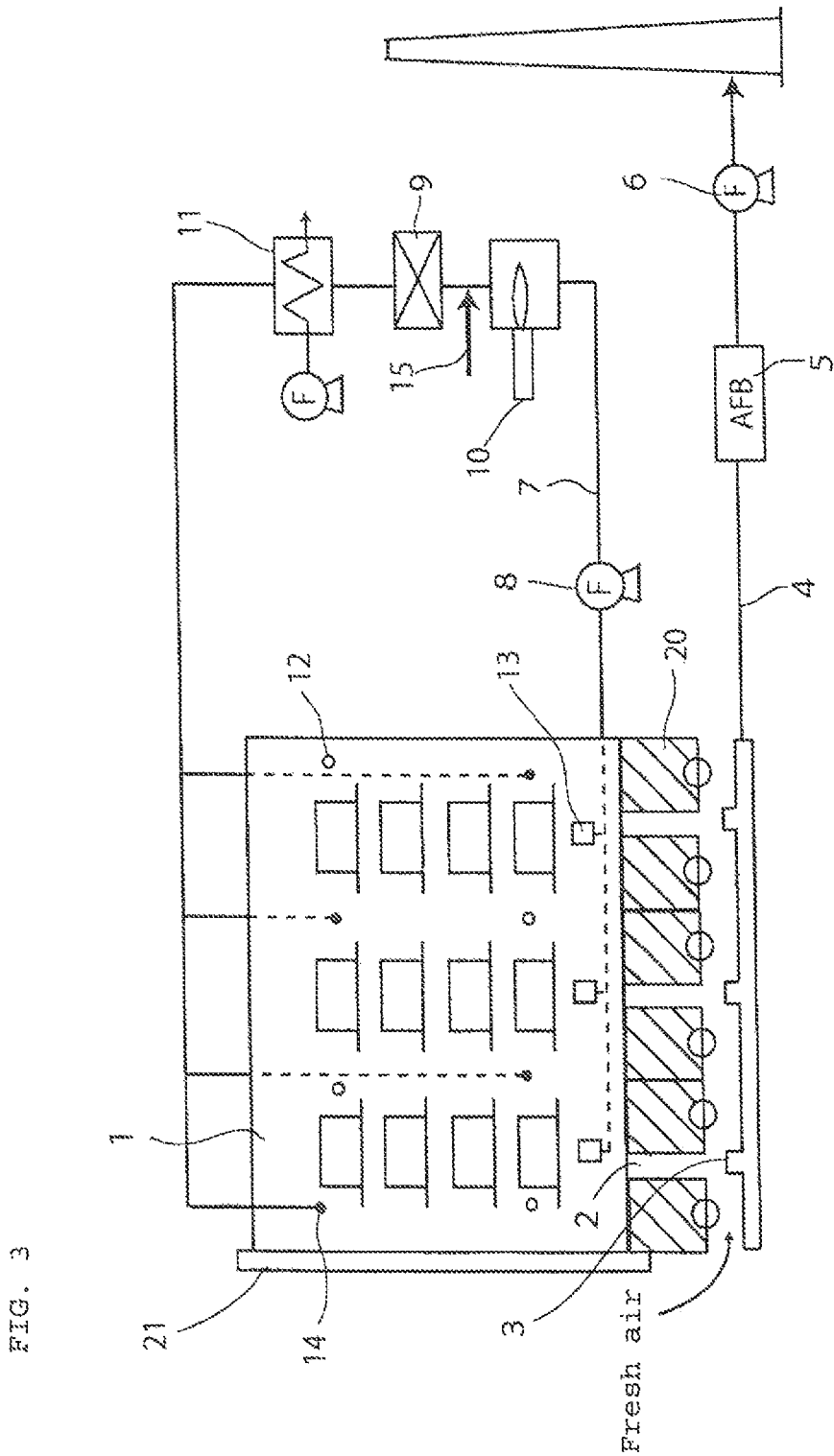
FIG. 3 is a schematic diagram showing another embodiment.

In a case where the concentration of the organic binder gases contained in the in-furnace gas is too low to decrease the oxygen concentration by sufficiently consuming oxygen contained in the in-furnace gas only through the resultant combustion, a fuel gas supply pipe 15 can be disposed to the stage preceding the catalytic reactor vessel, as shown in FIG. 3. Fuel gas supplied from the fuel gas supply pipe 15 may be burned in the catalytic reactor vessel to consume oxygen contained in the in-furnace gas in order to lower the oxygen concentration.

Figure 4:
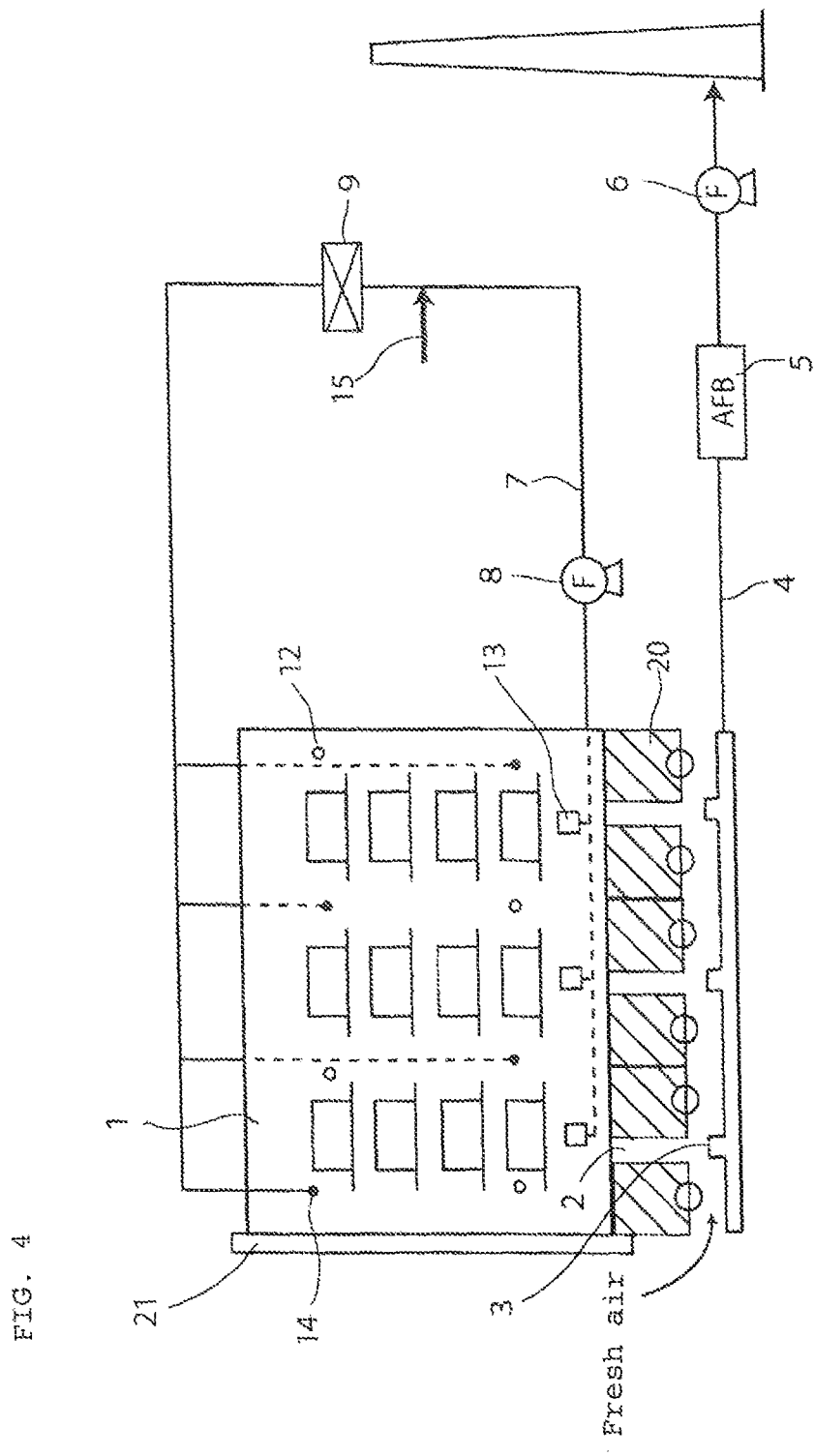
FIG. 4 is a schematic diagram showing a further embodiment.

An embodiment shown in FIG. 3 has a configuration in which the heating device 10 is provided to the stage preceding the catalytic reactor vessel to increase the temperature of the suctioned in-furnace gas to a catalyst activation temperature so that combustion may be enabled under the condition of a higher catalyst activation level. However, even a simple configuration in which the heating device 10 is omitted and only the fuel gas supply pipe 15 is disposed to the stage preceding the catalytic reactor vessel, as shown in FIG. 4, is capable of having an effect of consuming oxygen contained in the in-furnace gas to decrease the oxygen concentration in a case where the concentration of the organic binder gas concentration contained in the in-furnace gas is too low to decrease the oxygen concentration by sufficiently consuming oxygen contained in the in-furnace gas only through the resultant combustion.

A shuttle kiln of the invention having such a configuration may be used, similarly to conventional methods, to fire unfired ceramic porous bodies containing organic binders, for example, a ceramic honeycomb structure. In the binder releasing process in the early temperature rising phase, in-furnace gas and fresh air which enters the furnace body 1 through its lower portion are suctioned to the gas suction path 4 to burn and deodorize the contained organic binder gases with the afterburner 5, while at the same time the in-furnace gas is suctioned to the circulation path 7 through the circulating suction port 13 formed in the side wall of the furnace body 1. The in-furnace gas drawn to the circulation path 7 is heated by the heating device 10 to an activation temperature area of the oxidation catalyst and then passes through the catalytic reactor vessel. In this case, the contained organic binder gases undergoes catalytic combustion, and therefore the gas having passed through the catalytic reactor vessel is lower in organic binder gases concentration and also in oxygen concentration, and is cooled by the cooling device 11 to the predetermined in-furnace temperature and returned into the furnace body 1 through the circulating return port 14.

Figure 2:
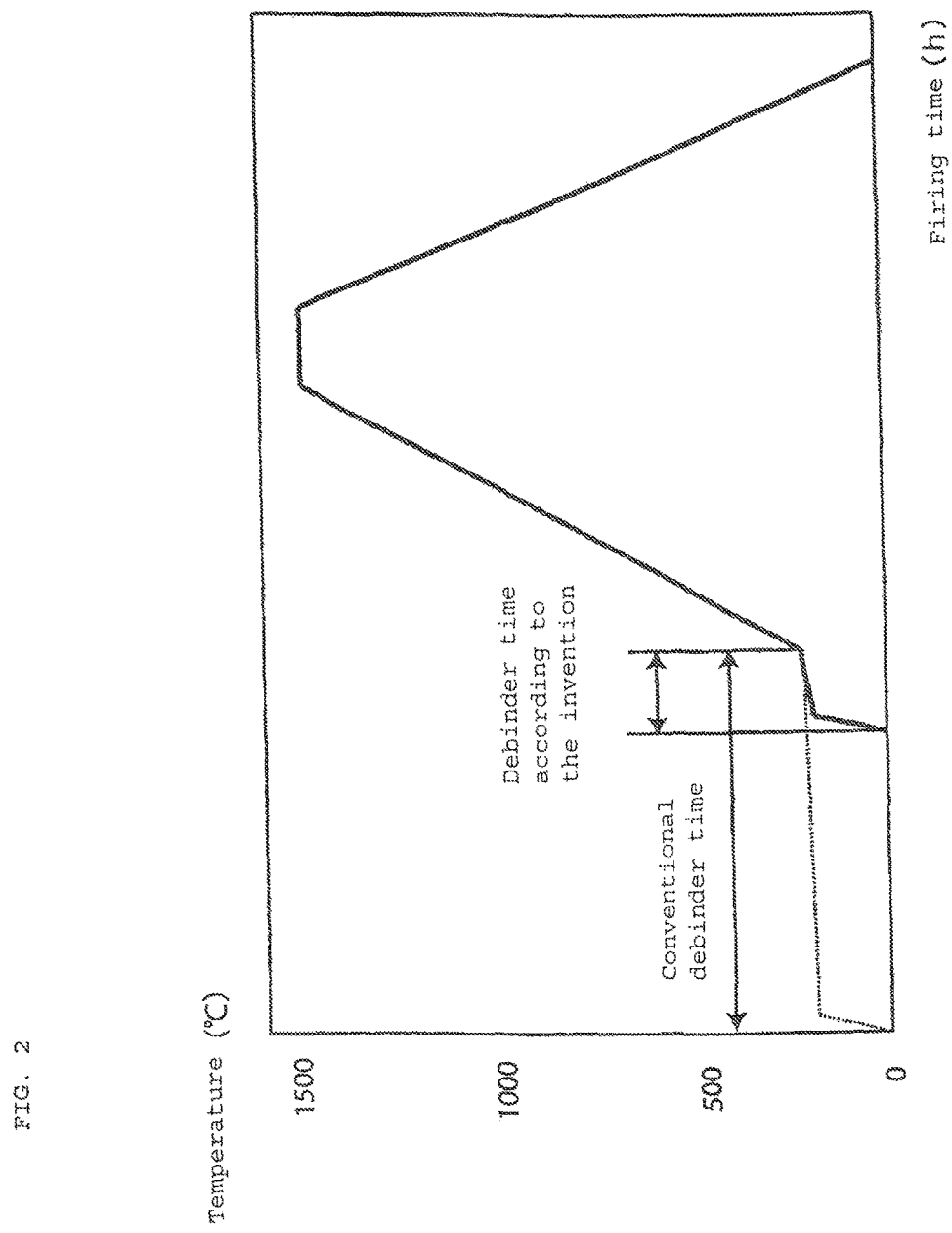
FIG. 2 is a graph showing changes in firing temperature.

As the circulation process is repeated, oxygen in the furnace is consumed while air is prevented from entering the furnace through its lower part. Consequently, the in-furnace oxygen concentration can be reduced to 8% or less as a target value, or preferably 5% or less. Further, organic binder gases generating from the ceramic porous bodies is also removed through catalytic combustion so that its concentration can be maintained at a low level of about ¼ of the explosion limit. In the binder releasing process in the early temperature rising phase, the in-furnace temperature needs to be raised moderately as shown in FIG. 2, but it is not always easy to control combustion of the many burners 12 placed in the furnace body 1. However, according to the invention, the in-furnace temperature can be easily and accurately controlled by controlling only the heating device 10 placed on the circulation path 7 while holding the many burners 12 placed in the furnace body 1 in an unignited state in the binder releasing process.

In a shuttle kiln of the invention, it is possible to arbitrarily control the gas circulation speed (gas circulation amount) along the circulation path 7 without influencing the in-furnace temperature. In the conventional shuttle kiln not provided with the circulation path 7, to control the oxygen concentration to 8% or less, or preferably 5% or less, the amount of air that can be drawn into the furnace must be limited, which causes a problem that stirring in the furnace becomes insufficient or the organic binder gas concentration increases. In contrast, according to the invention, it is possible to arbitrarily increase the gas circulation speed (gas circulation amount) along the circulation path 7 in the repetitive catalytic combustion process and, therefore, arbitrarily control the organic binder gas concentration while sufficiently stirring the inside of the furnace.

As described above, conventional methods require a long-time for releasing the binder to prevent occurrence of breaks in the binder releasing process. The behavior is denoted by a dotted line in FIG. 2. In contrast, if the shuttle kiln of the invention is used, it is possible to arbitrarily control the oxygen concentration as well as the organic binder gas concentration and, therefore, greatly reduce the binder releasing time to about ⅕ of the conventional value as denoted by a solid line in FIG. 2 while securely preventing the occurrence of breaks. After the binder releasing process ends, the operation of the circulation path 7 is stopped to perform firing at a high temperature by using the many burners placed in the furnace body 1.

As described hereinabove, according to the invention, by inhibiting rapid combustion of an organic binder by decreasing the oxygen concentration, the binder releasing process can be progressed efficiently while preventing the occurrence of breaks on ceramic porous bodies to thereby reduce the overall firing time to about ⅔ of the conventional value. Therefore, with a furnace having the same capacity as the conventional one, productivity can be improved to about 1.5-fold. Moreover, the in-furnace organic binder gas concentration can be controlled to a level much lower than the explosion limit and an advantage of excellent safety can be obtained.

DESCRIPTION OF REFERENCE NUMERALS

1 Furnace body
2 Gas flow path
3 Gas suction port
4 Gas suction path
5 Afterburner
6 Suction fan
7 Circulation path
8 Circulation fan
9 Combustion device
10 Heating device
11 Cooling device
12 Burner
13 Circulating suction port
14 Circulating return port
15 Fuel gas supply pipe
20 Carriage
21 Entry door

The invention claimed is:

1. A shuttle kiln for firing ceramic porous bodies containing organic binders, the kiln comprising:

a gas suction path that includes at least one gas suction port for suctioning an in-kiln gas outside the kiln and exhausting the in-kiln gas to the atmosphere via an afterburner; and a circulation path for suctioning the in-kiln gas outside the kiln, burning an organic binder gas contained in the in-kiln gas, and then recirculating the in-kiln gas back into the kiln, wherein the gas suction path and the circulation path are completely independent of each other, wherein the ceramic porous bodies are loaded on a carriage that reciprocates between the inside and the outside of the kiln, wherein the gas suction path and the gas suction port are located at a lower part of the carriage, and wherein the circulation path includes a catalytic reactor vessel for catalytic combustion of the suctioned in-kiln gas.

2. The shuttle kiln according to claim 1, wherein the in-kiln gas is suctioned to the circulation path from a side wall of the kiln body.

3. The shuttle kiln according to claim 1, further comprising a fuel gas supply pipe mounted in the circulation path upstream of the catalytic reactor vessel and used to supply a fuel gas.

4. The shuttle kiln according to claim 1, wherein the circulation path comprises:

a heating device mounted upstream of the catalytic reactor vessel and used to heat the suctioned in-kiln gas; and a cooling device mounted downstream of the catalytic reactor vessel and used to lower a temperature of the gas having passed through the catalytic reactor vessel to a predetermined temperature.

5. The shuttle kiln according to claim 3, wherein the circulation path comprises:

a heating device mounted upstream of the catalytic reactor vessel and used to heat the suctioned in-kiln gas; and a cooling device mounted downstream of the catalytic reactor vessel and used to lower a temperature of the gas having passed through the catalytic reactor vessel to a predetermined temperature.

* * * * *